United States Patent
Wang et al.

(10) Patent No.: US 10,516,860 B2
(45) Date of Patent: Dec. 24, 2019

(54) IMAGE PROCESSING METHOD, STORAGE MEDIUM, AND TERMINAL

(71) Applicant: NUBIA TECHNOLOGY CO., LTD, Shenzhen (CN)

(72) Inventors: Rui Wang, Shenzhen (CN); Xiaolin Zhang, Shenzhen (CN)

(73) Assignee: NUBIA TECHNOLOGY CO., LTD., Shenzhen (CN)

( * ) Notice: Subject to any disclaimer, the term of this patent is extended or adjusted under 35 U.S.C. 154(b) by 0 days.

(21) Appl. No.: 15/778,419

(22) PCT Filed: Sep. 20, 2016

(86) PCT No.: PCT/CN2016/099462
§ 371 (c)(1),
(2) Date: May 23, 2018

(87) PCT Pub. No.: WO2017/088568
PCT Pub. Date: Jun. 1, 2017

(65) Prior Publication Data
US 2018/0352201 A1  Dec. 6, 2018

(30) Foreign Application Priority Data
Nov. 26, 2015 (CN) .......................... 2015 1 0846789

(51) Int. Cl.
| | |
|---|---|
| H04N 9/04 | (2006.01) |
| G06T 3/40 | (2006.01) |
| H04N 5/33 | (2006.01) |

(52) U.S. Cl.
CPC ....... *H04N 9/04515* (2018.08); *G06T 3/4015* (2013.01); *H04N 5/332* (2013.01); *H04N 9/0455* (2018.08); *H04N 9/04553* (2018.08)

(58) Field of Classification Search
CPC ............. H04N 9/04515; H04N 9/0455; H04N 9/04553; H04N 5/332; G06T 3/4015
See application file for complete search history.

(56) References Cited

U.S. PATENT DOCUMENTS

| | | | | |
|---|---|---|---|---|
| 2005/0285966 A1* | 12/2005 | Bamji | ...................... | G01C 3/08 |
| | | | | 348/336 |
| 2012/0257030 A1* | 10/2012 | Lim | ................... | A61B 1/00009 |
| | | | | 348/70 |

(Continued)

FOREIGN PATENT DOCUMENTS

| | | |
|---|---|---|
| CN | 104350744 A | 2/2015 |
| CN | 105430358 A | 3/2016 |

OTHER PUBLICATIONS

The World Intellectual Property Organization (WIPO) International Search Report for PCT/CN2016/099462 dated Dec. 13, 2016 5 Pages.

*Primary Examiner* — Twyler L Haskins
*Assistant Examiner* — Akshay Trehan
(74) *Attorney, Agent, or Firm* — Anova Law Group, PLLC (57) ABSTRACT

The present disclosure provides an image processing method, device, terminal, and storage medium. The method includes: obtaining an RGB-NIR image sensor replacing a G component in a Bayer RGGB mode with an NIR component; using the RGB-NIR image sensor to obtain an RGB-NIR RAW image; and obtaining an RGB image and a near-infrared (NIR) image by demosaicing the RGB-NIR RAW image based on a vector median method.

11 Claims, 5 Drawing Sheets

Using the RGB-NIR image sensor to obtain a RGB-NIR RAW image — S101

Based on a vector median method, obtaining a RGB and near-infrared (NIR) image by demosaicing the RGB-NIR RAW image — S102

(56) References Cited

U.S. PATENT DOCUMENTS

| | | | | |
|---|---|---|---|---|
| 2013/0329101 A1* | 12/2013 | Choi | ............ | H04N 9/045 348/273 |
| 2014/0332665 A1* | 11/2014 | Jiang | ............ | H01L 27/1461 250/208.1 |
| 2015/0062347 A1* | 3/2015 | Jin | ............ | H04N 5/332 348/164 |
| 2015/0363913 A1* | 12/2015 | Higgins | ............ | G06T 3/4015 382/164 |

* cited by examiner

|   |   |   |   |   |
|---|---|---|---|---|
| 2 | 4 | 2 | 4 | 2 |
| 3 | 1 | 3 | 1 | 3 |
| 2 | 4 | 2 | 4 | 2 |
| 3 | 1 | 3 | 1 | 3 |
| 2 | 4 | 2 | 4 | 2 |

Fig. 2-3

|   |   |   |   |   |
|---|---|---|---|---|
| 2 | 4 | 2 | 4 | 2 |
| 3 | 1 | 3 | 1 | 3 |
| 2 | 4 | 2 | 4 | 2 |
| 3 | 1 | 3 | 1 | 3 |
| 2 | 4 | 2 | 4 | 2 |

IMAGE PROCESSING METHOD, STORAGE MEDIUM, AND TERMINAL

CROSS-REFERENCE TO RELATED APPLICATIONS

This application is a national phase entry under 35 U.S.C. § 371 of International Application No. PCT/CN2016/099462, filed on Sep. 20, 2016, which claims priority to and benefits of Chinese Patent Application Serial No. 201510846789.7, filed with the State Intellectual Property Office of P. R. China on Nov. 26, 2015, the entire content of all of which is incorporated herein by reference.

FIELD OF THE DISCLOSURE

The present disclosure generally relates to image processing technology and, more particularly, relates to an image processing method, device, terminal, and storage medium.

BACKGROUND

At present, image sensor chips in the terminals on the market such as mobile phones (such as (Charge-coupled Device) CCD or (Complementary Metal Oxide Semiconductor) COMS) acquire color information mostly by utilizing the CFA mode, i.e., covering a layer of Color Filter Array (CFA) on the surface of the pixel array. The relevant color information can be obtained through the CFA. Currently, the CFA format of the most widely used is Bayer format filter array, which uses the RGGB (Red Green Green Blue) combination rule.

However, with the development and application of infrared technology, the single CFA model cannot provide the infrared information required for image processing. At the same time, as a device of components with high integration density, a mobile phone has no more space to place two chips of visible-light image sensor and infrared-light image sensor. Because it is contrary to the current mainstream trend of miniaturization of mobile phones, there is no doubt that it will greatly increase the production cost.

BRIEF SUMMARY OF THE DISCLOSURE

Therefore, in order to solve at least one of above problems in existing technology, embodiments of the present disclosure provide an image processing method, device, terminal, and storage medium, which are provided for obtaining both the visible and infrared images without an infrared image sensor, saving hardware space and enhancing user experience.

The technical solution of embodiments of the present disclosure is implemented as follows:

According to a first aspect, embodiments of the present disclosure provide an image processing method, obtaining an RGB-NIR image sensor replacing a G component in a Bayer RGGB mode with an NIR component;
  using the RGB-NIR image sensor to obtain an RGB-NIR RAW image;
  based on a vector median method, obtaining an RGB image and a near-infrared (NIR) image by demosaicing the RGB-NIR RAW image.

According to a second aspect, embodiments of the present disclosure provide an image processing device, wherein the apparatus includes an acquisition unit and a demosaic unit:
  the acquisition unit is configured to use an RGB-NIR image sensor to obtain an RGB-NIR RAW image, wherein the RGB-NIR image sensor is configured to replace a G component in a Bayer RGGB mode with an NIR component; and
  the demosaic unit is configured to obtain an RGB image and a near-infrared (NIR) image by demosaicing the RGB-NIR RAW image based on a vector median method.

According to a third aspect, embodiments of the present disclosure provide a terminal, wherein the terminal includes an RGB-NIR image sensor, a memory and a processor:
  the RGB-NIR image sensor is configured to replace a G component in a Bayer RGGB mode with an NIR component to obtain an RGB-NIR RAW image;
  the memory is configured to store the RGB-NI R RAW image; and
  the processor is configured to use the RGB-NIR image sensor to obtain the RGB-NIR RAW image, and to obtain an RGB image and a near-infrared (NIR) image by demosaicing the RGB-NIR RAW image based on a vector median method.

According to a fourth aspect, embodiments of the present disclosure provide a storage medium, wherein the storage medium stores computer executable instructions, the computer executable instructions are used to perform an image processing method that is provided in embodiments of the first aspect of the present application.

An image processing method, device, terminal, and storage medium that is provided in embodiments of the present disclosure, obtaining an RGB-NIR image sensor replacing a G component in a Bayer RGGB mode with an NIR component; using the RGB-NIR image sensor to obtain an RGB-NIR RAW image; and obtaining an RGB image and a near-infrared (NIR) image by demosaicing the RGB-NIR RAW image based on a vector median method. Thus, without an infrared image sensor, both the visible and infrared image can be obtained, saving the hardware space and enhancing user experience.

BRIEF DESCRIPTION OF THE DRAWINGS

FIG. 1-1 is a schematic diagram of a hardware structure of a mobile terminal for implementing various embodiments of the present disclosure;

FIG. 1-2 is a structural diagram of a camera lens in the mobile terminal shown in FIG. 1-1;

FIG. 1-3 is a flowchart of an image processing method according to a first embodiment of the present disclosure;

FIG. 2-1 is a schematic diagram of RGB-NIR distribution according to embodiments of the present disclosure;

FIG. 2-2 is a RAW graph of a RBG-NIR color filter array according to embodiments of the present disclosure;

FIG. 2-3 is a schematic diagram of vertical and horizontal searching format used in demosaic processing according to embodiments of the present disclosure;

FIG. 2-4 is a schematic diagram of horizontal and diagonal searching format used in demosaic processing according to embodiments of the present disclosure;

DETAILED DESCRIPTION

It should be noted that the specific embodiments described herein are only used to explain the technical solution of the present disclosure and are not intended to limit the protection range of the present disclosure.

The mobile terminal according to embodiments of the present disclosure will now be described with reference to the accompanying drawings. In the following description, usage of suffixes such as 'module', 'part' or 'unit' used for referring to elements is given merely to facilitate explanation of the present application, without having any significant meaning by itself. Accordingly, the 'module' and 'part' may be mixedly used.

Mobile terminals may be implemented in various forms. For example, the terminal described in the present application may include mobile terminals such as mobile phones, smart phones, notebook computers, digital broadcast receivers, PDAs (Personal Digital Assistants), PMPs (Portable Multimedia Player), navigation devices, and the like, and fixed terminals such as digital TVs, desk top computers and the like. Hereinafter, it is assumed that the terminal is a mobile terminal. However, it would be understood by a person in the art that the configuration according to the embodiments of the present disclosure can be also applicable to the fixed types of terminals, except for any elements especially configured for a mobile purpose.

Figure 11:
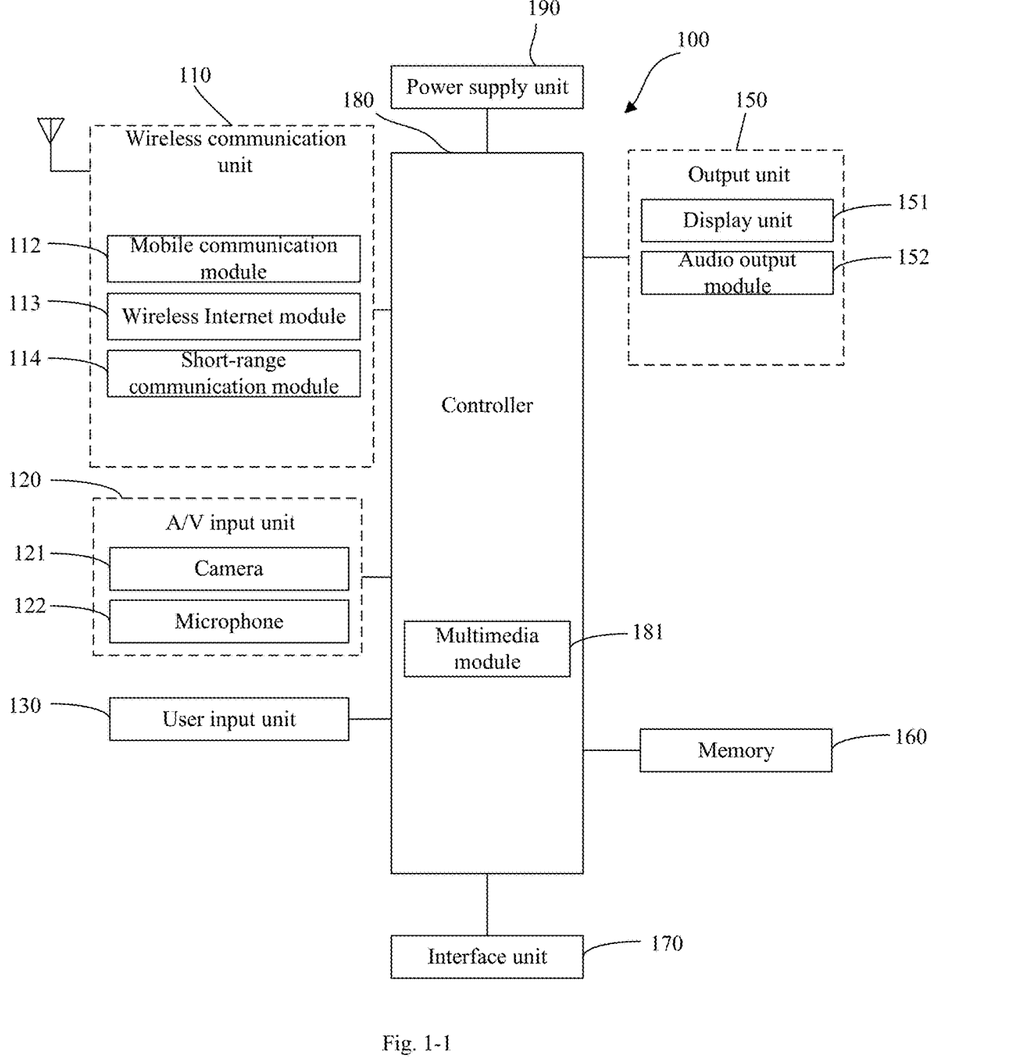

FIG. 1-1 is a block diagram of a mobile terminal according to an embodiment of the present disclosure. As shown in FIG. 1-1, the mobile terminal 100 may include a wireless communication unit 110, an A/V (Audio/Video) input unit 120, a user input unit 130, a sensing unit 140, an output unit 150, a memory 160, an interface unit 170, a controller 180, a power supply unit 190 and the like. FIG. 1-1 shows the mobile terminal as having various components, but it should be noted that implementing all of the illustrated components is not a requirement. More or fewer components may alternatively be implemented.

The wireless communication unit 110 typically includes one or more components allowing radio communication between the mobile terminal 100 and a wireless communication system or a network in which the mobile terminal is located. For example, the wireless communication unit may include at least one of a broadcast receiving module 111, a mobile communication module 112, a wireless Internet module 113, and a short-range communication module 114.

The mobile communication module 112 transmits and/or receives radio signals to and/or from at least one of a base station (e.g., access point, Node B, etc.), an external terminal and a server. Such radio signals may include a voice call signal, a video call signal or various types of data according to text and/or multimedia message transmission and/or reception.

The wireless Internet module 113 supports wireless Internet access for the mobile terminal. This module may be internally or externally coupled to the terminal. The wireless Internet access technique implemented may include a WLAN (Wireless LAN) (Wi-Fi), Wibro (Wireless broadband), Wimax (World Interoperability for Microwave Access), HSDPA (High Speed Downlink Packet Access), or the like.

The short-range communication module 114 is a module for supporting short range communications. Some examples of short-range communication technology include Bluetooth™, Radio Frequency IDentification (RFID), Infrared Data Association (IrDA), Ultra-WideBand (UWB), ZigBee™, and the like.

The A/V input unit 120 is configured to receive an audio or video signal. The A/V input unit 120 may include a camera 121 and a microphone 122. The camera 121 processes image data of still pictures or video obtained by an image capture device in a video capturing mode or an image capturing mode. The processed image frames may be displayed on a display unit 151. The image frames processed by the camera 121 may be stored in the memory 160 (or other storage medium) or transmitted via the wireless communication unit 110. Two or more cameras 121 may be provided according to the configuration of the mobile terminal. The microphone 122 may receive sounds (audible data) via a microphone in a phone call mode, a recording mode, a voice recognition mode, and the like, and can process such sounds into audio data. The processed audio (voice) data may be converted for output into a format transmittable to a mobile communication base station via the mobile communication module 112 during the phone call mode. The microphone 122 may implement various types of noise cancelling (or suppression) algorithms to cancel (or suppress) noise or interference generated in the course of receiving and transmitting audio signals.

The user input unit 130 may generate key input data from commands entered by a user to control various operations of the mobile terminal. The user input unit 130 allows the user to enter various types of information, and may include a keypad, a dome switch, a touch pad (e.g., a touch sensitive member that detects changes in resistance, pressure, capacitance, etc. due to being contacted) a jog wheel, a jog switch, and the like. In particular, when the touch pad is overlaid on the display unit 151 in a layered manner, it may form a touch screen.

The interface unit 170 serves as an interface by which at least one external device may be connected with the mobile terminal 100. For example, the external devices may include wired or wireless headset ports, an external power supply (or battery charger) ports, wired or wireless data ports, memory card ports, ports for connecting a device having an identification module, audio input/output (I/O) ports, video I/O ports, earphone ports, or the like. The identification module may be a memory chip that stores various information for authenticating a user's authority for using the mobile terminal 100 and may include a user identity module (UIM), a subscriber identity module (SIM) a universal subscriber identity module (USIM), and the like. In addition, the device having the identification module (referred to as the 'identifying device', hereinafter) may take the form of a smart card. Accordingly, the identifying device may be connected with the terminal 100 via a port or other connection means. The interface unit 170 may be used to receive inputs (e.g., data, information, power, etc.) from an external device and transfer the received inputs to one or more elements within the mobile terminal 100 or may be used to transfer data between the mobile terminal and an external device.

In addition, when the mobile terminal 100 is connected with an external cradle, the interface unit 170 may serve as a conduit to allow power from the cradle to be supplied therethrough to the mobile terminal 100 or may serve as a conduit to allow various command signals input from the cradle to be transferred to the mobile terminal therethrough. Various command signals or power input from the cradle may be operated as a signal for recognizing that the mobile terminal is accurately mounted on the cradle. The output unit 150 is configured to provide outputs in a visual, audible, and/or tactile manner (e.g., audio signal, video signal, alarm signal, vibration signal, etc.). The output unit 150 may include the display unit 151, an audio output module 152, an alarm unit 153, and the like.

The display unit 151 may display information processed in the mobile terminal 100. For example, when the mobile terminal 100 is in a phone call mode, the display unit 151 may display a User Interface (UI) or a Graphic User Interface (GUI) associated with a call or other communication (such as text messaging, multimedia file downloading, etc.). When the mobile terminal 100 is in a video call mode or image capturing mode, the display unit 151 may display a captured image and/or received image, a UI or GUI that shows videos or images and functions related thereto, and the like.

Meanwhile, when the display unit 151 and the touch pad are overlaid in a layered manner to form a touch screen, the display unit 151 may function as both an input device and an output device. The display unit 151 may include at least one of a Liquid Crystal Display (LCD), a Thin Film Transistor-LCD (TFT-LCD), an Organic Light Emitting Diode (OLED) display, a flexible display, a three-dimensional (3D) display, or the like. Some of them may be configured to be transparent to allow viewing of the exterior, which may be called transparent displays. A typical transparent display may be, for example, a TOLED (Transparent Organic Light Emitting Diode) display, or the like. The mobile terminal 100 may include two or more display units (or other display means) according to its desired embodiment. For example, the mobile terminal may include both an external display unit and an internal display unit. The touch screen may be configured to detect even a touch input pressure as well as a touch input position and a touch input area.

The audio output module 152 may convert and output as sound audio data received from the wireless communication unit 110 or stored in the memory 160 in a call signal reception mode, a call mode, a record mode, a voice recognition mode, a broadcast reception mode, and the like. Also, the audio output module 152 may provide audible outputs related to a particular function performed by the mobile terminal 100 (e.g., a call signal reception sound, a message reception sound, etc.). The audio output module 152 may include a speaker, a buzzer, or the like.

The memory 160 may store software programs or the like used for the processing and controlling operations performed by the controller 180, or may temporarily store data (e.g., a phonebook, messages, still images, video, etc.) that have been output or which are to be output. Also, the memory 160 may store data regarding various patterns of vibrations and audio signals output when a touch is applied to the touch screen.

The memory 160 may include at least one type of storage medium including a Flash memory, a hard disk, a multimedia card, a card-type memory (e.g., SD or DX memory, etc), a Random Access Memory (RAM), a Static Random Access Memory (SRAM), a Read-Only Memory (ROM), an Electrically Erasable Programmable Read-Only Memory (EEPROM), a Programmable Read-Only Memory (PROM), a magnetic memory, a magnetic disk, an optical disk, and the like. Also, the mobile terminal 100 may cooperate with a network storage device that performs the storage function of the memory 160 over a network connection.

The controller 180 typically controls the general operations of the mobile terminal. For example, the controller 180 performs controlling and processing associated with voice calls, data communications, video calls, and the like. In addition, the controller 180 may include a multimedia module 181 for reproducing (or playing back) multimedia data. The multimedia module 181 may be configured within the controller 180 or may be configured to be separate from the controller 180. The controller 180 may perform a pattern recognition processing to recognize a handwriting input or a picture drawing input performed on the touch screen as characters or images.

The power supply unit 190 receives external power or internal power and supplies appropriate power required for operating respective elements and components under the control of the controller 180.

Various embodiments as described herein may be implemented in a computer-readable medium using, for example, computer software, hardware, or any combination thereof. For hardware implementation, the embodiments described herein may be implemented by using at least one of application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic units designed to perform the functions described herein. In some instances, such embodiments may be implemented in the controller 180. For software implementation, the embodiments such as procedures or functions may be implemented together with separate software modules that allow performing of at least one function or operation. Software codes can be implemented by a software application (or program) written in any suitable programming language. The software codes may be stored in the memory 160 and executed by the controller 180.

So far, the mobile terminal has been described from the perspective of its functions. Hereinafter, a slide-type mobile terminal, among various types of mobile terminal such as folder-type, bar-type, swing-type, slide type mobile terminals, or the like, will be described as an example for the sake of brevity. Thus, the present invention can be applicable to any type of mobile terminal, without being limited to the slide-type mobile terminal.

Figure 12:
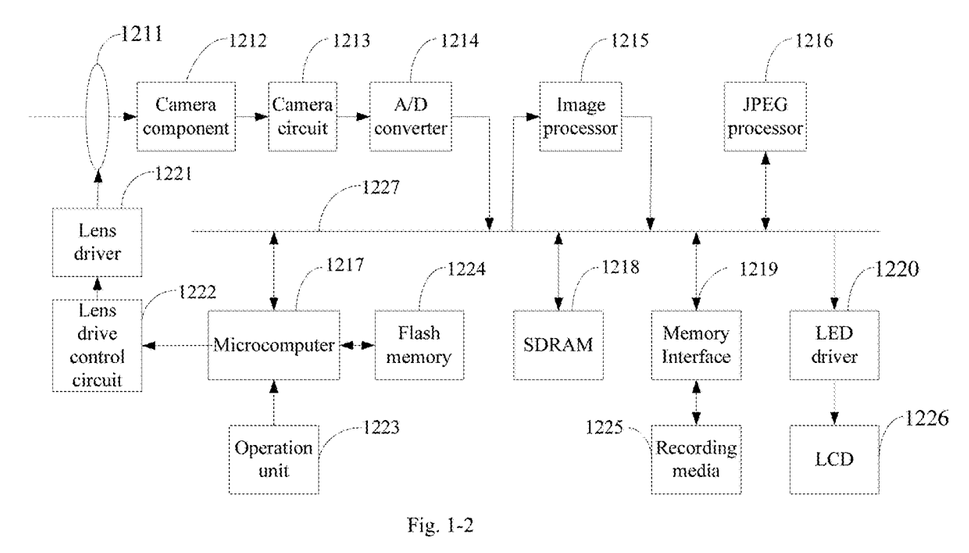

In embodiments of the present disclosure, the mobile terminal further includes a camera lens, as shown in FIG. 1-2, the camera lens 1211 is composed of a plurality of optical lenses for forming a subject image, which is single focus lens or zoom lens. Under the control of a lens driver 1221, the camera lens 1211 can move in the direction of optical axis. According to the control signal from a lens drive control circuit 1222, the lens driver 1221 can control the focus position of the camera lens 1211, it can also control the focal distance in the case of the zoom lens. The lens drive control circuit 1222 control the lens driver 1221 according to the control command from a microcomputer 1217.

On the optical axis of the camera lens 1211, a camera component 1212 is disposed in the vicinity of the position of the subject image formed by the camera lens 1211. The camera component 1212 is used to capture the subject image and obtain captured image data. In the camera component 1212, a two-dimensional matrix is arranged in the photodiode that make up each pixel. Each photodiode generates a photoelectric conversion current corresponding to the light reception. The photoelectric conversion current is charge-accumulated by a capacitor connected to each photodiode. A Bayer-arranged RGB color filter is arranged on the front surface of each pixel.

The camera component 1212 is connected to a camera circuit 1213. In the camera component 1212, the camera circuit 1213 is charge-accumulated and image signal read-out, the readout image signal (analog image signal) is subjected to waveform shaping after reducing the resetting noise, and increase gain to be an appropriate signal level. The camera circuit 1213 is connected to an A/D converter 1214, the A/D converter 1214 converts the analog image signal into a modulus, and outputs a digital image signal (hereinafter referred to as image data) to a bus 1227.

The bus 1227 is a transmission path for transmitting various data read out or generated inside the camera. The bus 1227 is connected to the A/D converter 1214, an image processor 1215, a JPEG processor 1216, the microcomputer 1217, a SDRAM (Synchronous Dynamic Random-Access Memory) 1218, a memory interface (hereinafter referred to as a memory I/F) 1219, and a LED (Liquid Crystal Display) driver 1220.

The image processor 1215 performs various image processing such as OB subtraction, white balance adjustment, color matrix operation, gamma conversion, color difference signal processing, noise removal processing, synchronization processing, and edge processing on the image data from the output of the camera component 1212. The JPEG processor 1216 compresses the image data read from the SDRAM 1218 according to the JPEG compression method when recording the image data on the recording media 1225. In addition, the JPEG processor 1216 decompresses the JPEG image data in order to display the image of reproduction. For decompressing, the file that is recorded in the recording media 1225 is read. After the decompression processing is performed in the JPEG processor 1216, the image data that is decompressed is temporarily stored in the SDRAM 1218 and displayed on the LCD 1226. In embodiments of the present disclosure, a JPEG format is used as an image compression and decompression format. However, the compression and decompression format is not limited thereto. Of course, other compression and decompression formats, such as MPEG, TIFF and H.264, can also be used.

The microcomputer 1217 develops the function as a control unit of the entire camera and controls various processing sequences of the camera. The microcomputer 1217 is connected to an operation unit 1223 and a flash memory 1224.

The operation unit 1223 includes but is not limited to a physical button(s) or a virtual button(s), and a physical button or virtual button may be an operation control such as a power button, a photographing button, an edit button, a moving image button, a reproduction button, a menu button, a cross button, an OK button, a delete button, an enlarge button and other various input buttons and input keys, check the operation status of these operation controls.

The detection result is output to the microcomputer 1217. In addition, a touch panel is put on the front surface of the LCD 1226 as a monitor, the touch position of the user is detected, and output to the microcomputer 1217. The microcomputer 1217 executes various processing sequences that is corresponding to the user's operation according to the detection result of the operating position from the operation unit 1223.

The flash memory 1224 stores programs for executing various processing sequences of the microcomputer 1217. The microcomputer 1217 controls the entire camera according to the program. In addition, the flash memory 1224 stores various adjustment values of the camera, the microcomputer 1217 reads the adjustment value, and controls the camera according to the adjustment value.

The SDRAM 1218 is an electrically rewritable volatile memory that is used to temporarily store the image date. The SDRAM 1218 temporarily stores the image date that is output from the A/D converter 1214 and processed in the image processor 1215, the JPEG processor 1216, and the like.

The memory interface 1219 is connected to the recording media 1225, and carries out the control of writing image date and file top date attached to the image date into the recording media 1225, reading them from the recording media 1225. The recording media 1225 is a recording medium such as a memory card that is detachably attachable to the camera body. However, the recording media 1225 is not limited to this, and may be a hard disk in the camera body.

An LED driver 1220 is connected to the LCD 1226, stores the image date that is processed by the image processor 1215 in the SDRAM 1218, reads the image date stored in the SDRAM 1218 and displays it on the LCD 1226 when it needs to be displayed. Or, stores the image date that is compressed by the JPEG processor 1216 in the SDRAM 1218, reads the compressed image date stored in the SDRAM 1218, then decompresses the image date, and displays the decompressed image date on the LCD 1226 when it needs to be displayed.

The LCD 1226 is configured to display images on the back of the camera body. The LCD 1226 is an LCD. However, the LCD 1226 is not limited to this, and various types of display panels such as an organic EL may be used.

Based on the hardware structure of mobile terminal and the camera lens, various embodiments of the method of the present disclosure are proposed. In the following embodiments of the present disclosure, a new type of CFA array mode is proposed, as a G component of RGGB in an original Bayer mode is replaced by an NIR component. At the same time, based on an original RAW image that is obtained from the RGB-NIR image sensor, providing a new color interpolation method for the multi-spectral mode, which can simultaneously obtain two full-size images of RGB and near-infrared NIR under the condition of taking a picture at a time. So, the technical solution of embodiments of the present disclosure saves the hardware space and doesn't need the infrared and visible light image sensors respectively to obtain the corresponding image. Because the infrared image sensor is not needed, the corresponding production cost is saved. The two images of visible light and infrared light can be obtained through taking a picture at a time, which provides greatly convenience for other related image processing operations in follow-up, saves time and labor costs.

The technical solution of the present disclosure is further elaborated with reference to the accompanying drawings and specific embodiments.

Embodiment One

Embodiments of the present disclosure provide an image processing method, applied to a terminal, the terminal comprising an RGB-NIR image sensor, which may replace a G component in a Bayer RGGB mode with an NIR component; the functions implemented by the method can be achieved by calling the program code of the processor in the terminal. Of course, the program code can be stored in a computer storage medium. It can be seen that the terminal includes at least a processor and a computer storage medium.

Figure 13:
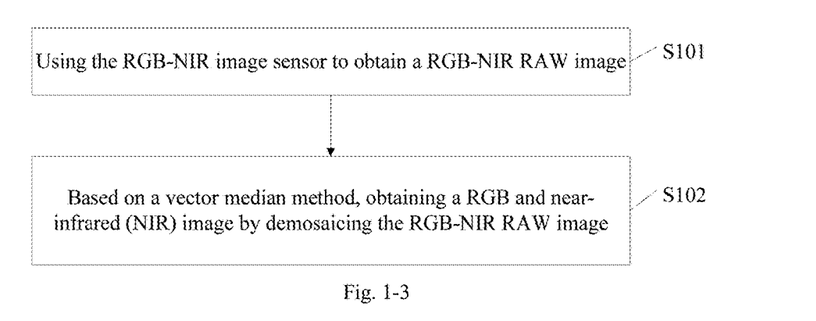

FIG. 1-3 is a flowchart of an image processing method according to a first embodiment of the present disclosure, as shown in FIG. 1-3, the method includes the followings.

Step S101, using the RGB-NIR image sensor to obtain an RGB-NIR RAW image.

Step S102, based on a vector median method, obtaining an RGB image and a near-infrared (NIR) image by demosaicing the RGB-NIR RAW image.

In this embodiment of the present disclosure, in step S102, based on a vector median method, obtaining an RGB image and a near-infrared (NIR) image by demosaicing the RGB-NIR RAW image includes the followings.

Step S111, using spectral color information for a first pixel set to form an N-dimensional vector of the first pixel.

Here, the first pixel is each pixel in the RGB-NIR RAW image, and the first pixel set contains the pixels around the first pixel, where the N is the number of spectral color components.

Here, the step S111, using spectral color information of the pixels around the first pixel to form the vector of each spectral color component of the first pixel includes the followings.

Step S1111, based on a horizontal and diagonal searching format, or a vertical and horizontal searching format, determining the first pixel set.

Step S1112, obtaining spectral color information for the first pixel set.

Step S1113, using spectral color information for the first pixel set to form the vector of each spectral color component of the first pixel.

Step S112, determining a corresponding vector median according to an element value of each dimension vector in the N-dimensional vector.

Step S113, forming an N-dimensional median vector $x=\{x_1, \ldots x_n\}$ by N medians that are corresponding to the N-dimensional vector of the first pixel, wherein $x_i$ stands for a median of i-th vector in the N-dimensional vector, $1 \le i \le N$;

$$r = \sqrt{x_n^2 + \ldots + x_1^2}$$

$$\varphi_1 = \text{arc cot} \frac{x_1}{\sqrt{x_2^2 + \ldots + x_n^2}}$$

$$\ldots$$

$$\varphi_{n-2} = \text{arc cot} \frac{x_{n-2}}{\sqrt{x_{n-1}^2 + x_n^2}}$$

Step S114, according to $$\varphi_{n-1} = 2\text{arc cot} \frac{\sqrt{x_{n-1}^2 + x_n^2} + x_{n-1}}{x_n},$$

translating $x=\{x_1, \ldots x_n\}$ into $y=\{r, \phi_1, \ldots \phi_{n-1}\}$.

Step S115, using 2-dimensional median filtering to process the (N−1)-dimensional vector $\{\phi_1, \ldots \phi_{n-1}\}$.

Step S116, according to:

$$\bar{x}_1 = r\cos(\phi_1)$$

$$\bar{x}_2 = r\sin(\phi_1)\cos(\phi_2)$$

$$\ldots$$

$$\bar{x}_{n-1} = r\sin(\phi_1) \ldots \sin(\phi_{n-2})\cos(\phi_{n-1})$$

$$\bar{x}_{n-1} = r\sin(\phi_1) \ldots \sin(\phi_{n-2})\cos(\phi_{n-1}),$$

calculating a filtered value in the N-dimensional Euclid space to obtain $\bar{x}=\{\bar{x}_1, \ldots \bar{x}_n\}$, as a final pixel vector.

In this embodiment of the present disclosure, step S112, according to the element value of each dimension vector in the N-dimensional vector, determining the N-dimensional vector median of the first pixel, further include the followings.

Step S1121, for the element value of each dimension vector $x_i$, calculating a one-dimensional distance $$S_i^1 = \sum_{j=1}^{N} \|x_i - x_j\|_1, \quad i = 1, \ldots N$$

and two-dimensional distance $$S_i^2 = \sum_{j=1}^{N} \|x_i - x_j\|_2, \quad i = 1, \ldots N$$

between the element and a neighbouring element, and counting a sum $S_i$ of the one-dimensional distance and the two-dimensional distance as $S_i = S_i^1 + S_i^2$.

Step S1122, determining the element $x_i$ corresponding to a minimum value in the $S_i$ to be the corresponding vector median.

The technical solution provided in the embodiments of the present disclosure, because the infrared image sensor is not needed, not only saves the corresponding production cost, but also saves the hardware space, and there is no need for the infrared and visible light image sensors respectively to obtain the corresponding image, while the two images of visible light and infrared light can be obtained through taking a picture at a time, greatly bringing convenience for other related subsequent image processing operations, and saving time and labor cost.

Embodiment Two

Figure 21:
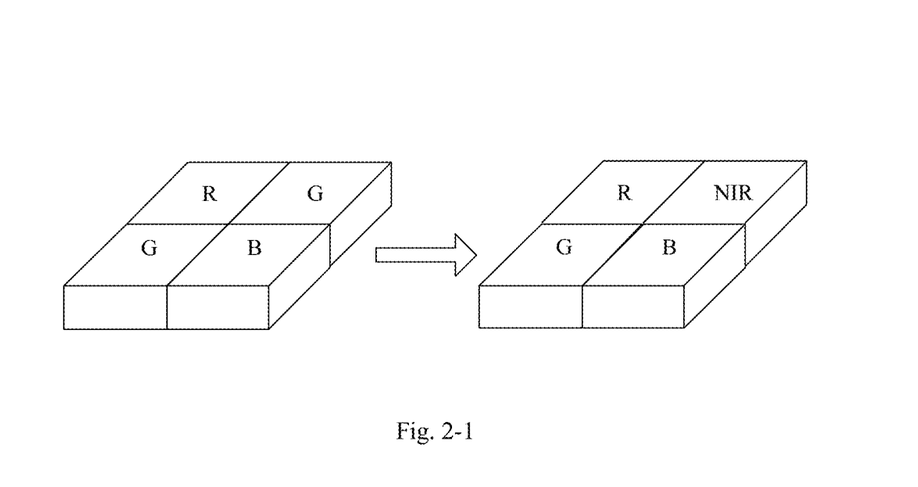
Figure 22:
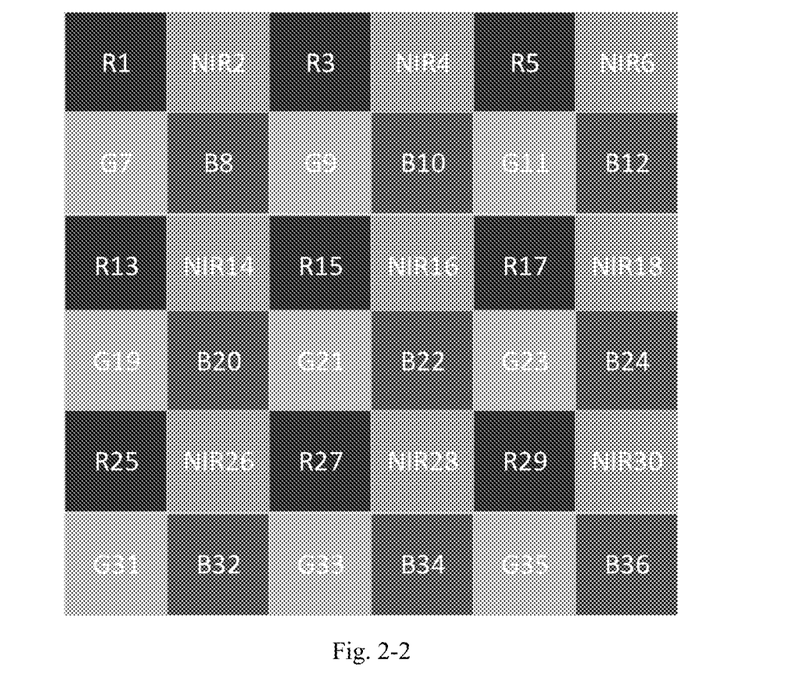
Figure 23:
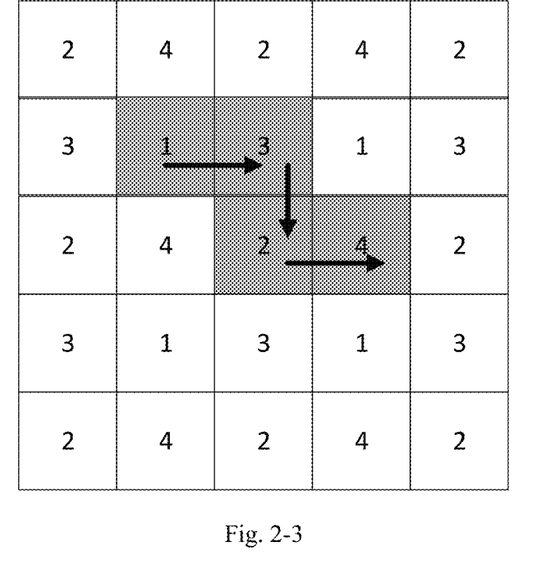
Figure 24:
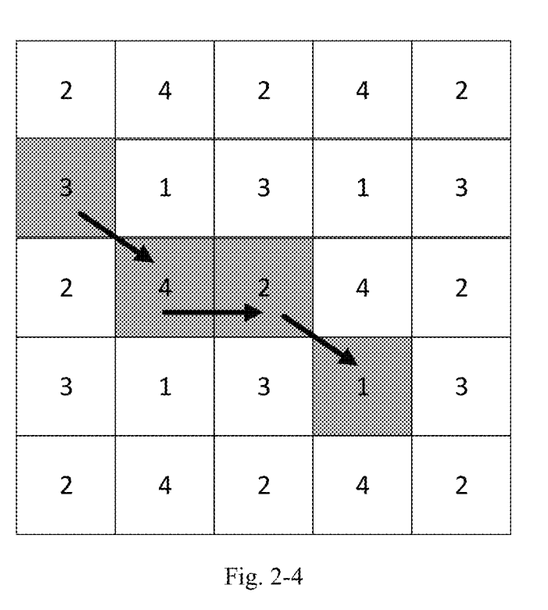

Traditional CAF work is to cover a layer of Color Filter Array (CFA) on the surface of the image sensor chip, just like the Bayer mode, i.e., the RGGB arrangement. The filter allows only the spectral information of the corresponding color spectrum to pass, so each pixel can only obtain information on one color, but miss information on the other two colors. Thus, a RAW image is obtained as a mosaic image. In order to obtain the full color image, the color information of the surrounding pixels is used to estimate the other two missing colors. This process is called color interpolation, or demosaicing. According to a new color filter matrix proposed by embodiments of the present disclosure, a G component of RGGB in a traditional Bayer mode is replaced by an NIR component. FIG. 2-1 is a schematic diagram of RGB-NIR distribution according to embodiments of the present disclosure. As shown in FIG. 2-1, the left side of FIG. 2-1 shows a schematic diagram of RGGB in a traditional Bayer mode distribution, and the right side of FIG. 2-1 shows a schematic diagram of RGB-NIR distribution according to embodiments of the present disclosure. It can be seen from FIG. 2-1 that a G component of RGGB in a traditional Bayer mode is replaced by an NIR component in embodiments of the present disclosure. After obtaining the RAW image through the RBG-NIR color filter array (as shown in FIG. 2-2), two full-size images of RGB and near-infrared NIR are finally obtained through the corresponding interpolation algorithm.

Based on the RGB-NIR distribution shown in FIG. 2-1, embodiments of the present disclosure demosaic the original multispectral RGB-NIR RAW image according to a vector median method, the demosaic processing includes the followings.

First, for each pixel, searching pseudo-pixels in the surrounding pixels of the pixel to form the vector, the searching rules can have any combination of vertical, horizontal, or diagonal. For example, in FIG. 2-2, the pixel block with the number of 22 is a pixel of B-channel, in order to obtain the other R, G and NIR channel values on the pixel block with the number 22, a vertical and horizontal format is used to find eight pixels around the point of B22 to form a combination of pseudo-pixel vectors as follows:

$$\begin{bmatrix} R22 \\ NIR22 \\ B22 \\ G22 \end{bmatrix} = \left\{ \begin{bmatrix} R15 & R15 & R17 & R17 & R27 & R27 & R29 & R29 \\ NIR16 & NIR16 & NIR16 & NIR16 & NIR28 & NIR28 & NIR28 & NIR28 \\ B22 & B22 & B22 & B22 & B22 & B22 & B22 & B22 \\ G21 & G23 & G21 & G23 & G21 & G23 & G21 & G23 \end{bmatrix} \right\} \quad (2\text{-}1)$$

Then, interpolation can be performed after using pseudo-pixel vectors to represent each spectral color component (R, G, B, NIR), the specific steps are as follows:

1) for the element of each dimension vector $x_i$, calculating a one-dimensional distance $$S_i^1 = \sum_{j=1}^{N} \|x_i - x_j\|_1, \quad i = 1, \ldots N$$

and two-dimensional distance $$S_i^2 = \sum_{j=1}^{N} \|x_i - x_j\|_2, \quad i = 1, \ldots N$$

between the element and a neighbouring element, and counting a sum $S_i$ of the one-dimensional distance and the two-dimensional distance, as $S_i = S_i^1 + S_i^2$.

2) finding the element $x_i$ that are corresponding to a minimum value in the $S_i$, as the vector median.

3) respectively, finding the corresponding vector median of each spectral color on the pixel block to constitute $x = \{x_1, \ldots x_n\}$; where N is the number of color spectrum that corresponding to each pixel block, for example, number 22 corresponds to N=4, as (R, G, B, NIR). Then, translating $x = \{x_1, \ldots x_n\}$ into $y = \{r, \phi_1, \ldots \phi_{n-1}\}$ according to the following formula (2-2):

$$r = \sqrt{x_n^2 + \ldots + x_1^2} \quad (2\text{-}2)$$

$$\varphi_1 = \text{arc cot} \frac{x_1}{\sqrt{x_2^2 + \ldots + x_n^2}}$$

$$\ldots$$

$$\varphi_{n-2} = \text{arc cot} \frac{x_{n-2}}{\sqrt{x_{n-1}^2 + x_n^2}}$$

$$\varphi_{n-1} = 2 \text{arc cot} \frac{\sqrt{x_{n-1}^2 + x_n^2} + x_{n-1}}{x_n}$$

4) using 2-dimensional median filtering to process an (N−1)-dimensional vector $\{\phi_1, \ldots \phi_{n-1}\}$;

5) according to formula (2-3), calculating a filtered value in the N-dimensional Euclid space (N=4) to obtain $x = \{\bar{x}_1, \ldots \bar{x}_n\}$, as a final pixel vector.

$$\bar{x}_1 = r \cos(\phi_1) \quad (2\text{-}3)$$

$$\bar{x}_2 = r \sin(\phi_1) \cos(\phi_2)$$

$$\ldots$$

$$\bar{x}_{n-1} = r \sin(\phi_1) \ldots \sin(\phi_{n-2}) \cos(\phi_{n-1})$$

$$\bar{x}_{n-1} = r \sin(\phi_1) \ldots \sin(\phi_{n-2}) \sin(\phi_{n-1}),$$

Thus, in embodiments of the present disclosure, based on the alternative plan of G-NIR, a new color interpolation method is provided for the multi-spectral mode, which can simultaneously obtain two full-size images of RGB and near-infrared NIR under the condition of taking a picture once, demosaicing the original multi-spectral RGB-NIR RAW image according to a vector median method, i.e., searching pseudo-pixels from surrounding pixels for each pixel to form the vector, where the searching rules can have any combination of vertical, horizontal, or diagonal, and obtaining two full-size images of RGB and near-infrared NIR. Thus, in embodiments of the present disclosure, because the infrared image sensor is not needed, the corresponding production cost is saved; the two images of visible light and infrared light can be obtained through taking a picture only once, providing great convenience for other subsequent related image processing operations, and saving time and labor cost.

Embodiment Three

Based on the preceding method embodiments, embodiments of the present disclosure provide an image processing device. Each unit included in the device, each module included in each unit, and each sub-module included in each module can be implemented by a processor in the terminal. Of course, it can be implemented by the specific logic circuits. In the specific embodiments, the processor can be Central Processing Unit (CPU), Microprocessor (MPU), Digital Signal Processor (DSP) or Field Programmable Gate Array (FPGA), and so on.

Figure 3:
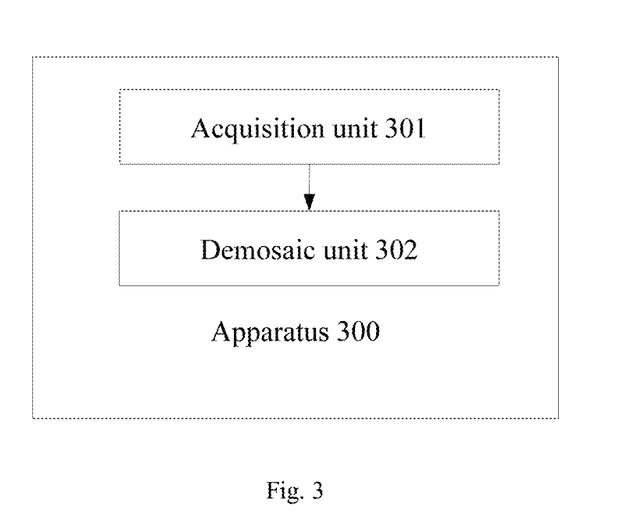
FIG. 3 is a flowchart of an image processing device according to a third embodiment of the present disclosure.

FIG. 3 is a structural diagram t of an image processing device according to a third embodiment of the present disclosure, as shown in FIG. 3, the apparatus 300 includes an acquisition unit 301 and a demosaic unit 302.

The acquisition unit 301 is configured to use the RGB-NIR image sensor to obtain an RGB-NIR RAW image.

The demosaic unit 302 is configured to obtain an RGB image and a near-infrared (NIR) image by demosaicing the RGB-NIR RAW image based on a vector median method.

In embodiments of the present disclosure, the demosaic unit includes a composition module, a determination module, a component module, a conversion module, a filter module and a calculation module:

The composition module is configured to use spectral color information for a first pixel set to form an N-dimensional vector of the first pixel, the first pixel is each pixel in the RGB-NIR RAW image, and the first pixel set is the pixels around the first pixel, and the N is the number of spectral color components.

The determination module is configured to determine a corresponding vector median according to an element value of each dimension vector in the N-dimensional vector.

The component module is configured to form an N-dimensional median vector $x = \{x_1, \ldots x_n\}$ by N medians that are corresponding to the N-dimensional vector of the first pixel, wherein $x_i$ stands for a median of i-th vector in the N-dimensional vector, $1 \leq i \leq N$.

The conversion module is configured to translate $x=\{x_1, \ldots x_n\}$ into $$r = \sqrt{x_n^2 + \ldots + x_1^2}$$

$$\varphi_1 = \text{arc cot} \frac{x_1}{\sqrt{x_2^2 + \ldots + x_n^2}}$$

$$\ldots$$

$$\varphi_{n-2} = \text{arc cot} \frac{x_{n-2}}{\sqrt{x_{n-1}^2 + x_n^2}}$$

$y=\{r, \phi_1, \ldots \phi_{n-1}\}$ according to $$\varphi_{n-1} = 2\text{arc cot} \frac{\sqrt{x_{n-1}^2 + x_n^2} + x_{n-1}}{x_n}.$$

The filter module is configured to use 2-dimensional median filtering to process an (N−1)-dimensional vector $\{\phi_1, \ldots \phi_{n-1}\}$.

The calculation module is configured to calculate a filtered value in the N-dimensional Euclid space to obtain $\bar{x}\{\bar{x}_1, \ldots \bar{x}_n\}$ that is a final pixel vector, according to $$\bar{x}_1 = r\cos(\phi_1)$$

$$\bar{x}_2 = r\sin(\phi_1)\cos(\phi_2)$$

$$\ldots$$

$$\bar{x}_{n-1} = r\sin(\phi_1)\ldots \sin(\phi_{n-2})\cos(\phi_{n-1})$$

$$\bar{x}_{n-1} = r\sin(\phi_1)\ldots \sin(\phi_{n-2})\sin(\phi_{n-1}).$$

In embodiments of the present disclosure, the composition module includes a determination sub-module, an acquisition sub-module, and a composition sub-module.

The determination sub-module is configured to determine the first pixel set based on a horizontal and diagonal searching format or a vertical and horizontal searching format;

The acquisition sub-module is configured to obtain spectral color information for the first pixel set.

The composition sub-module is configured to use the spectral color information for the first pixel set to form the vector of each spectral color component of the first pixel.

In embodiments of the present disclosure, the determination module includes a calculation sub-module and a determination sub-module:

The calculation sub-module is configured to, for the element of each dimension vector $x_i$, calculate a one-dimensional distance $$S_i^1 = \sum_{j=1}^{N} \|x_i - x_j\|_1, \quad i = 1, \ldots N$$

and two-dimensional distance $$S_i^2 = \sum_{j=1}^{N} \|x_i - x_j\|_2, \quad i = 1, \ldots N$$

between the element and a neighbouring element, and calculate a sum $S_i$ of the one-dimensional distance and the two-dimensional distance, $S_i + S_i^1 + S_i^2$.

The determination sub-module is configured to determine the element $x_i$ corresponding to a minimum value in the $S_i$ to be the corresponding vector median.

It should be noted that the description of the device embodiments is similar to the description of the preceding method embodiments, with similar beneficial effects as the method embodiment, thus not repeated herein. For technical details that are not described in the apparatus embodiments, please refer the description of the method embodiments of the present disclosure, so it's not repeated here.

Embodiment Four

Figure 4:
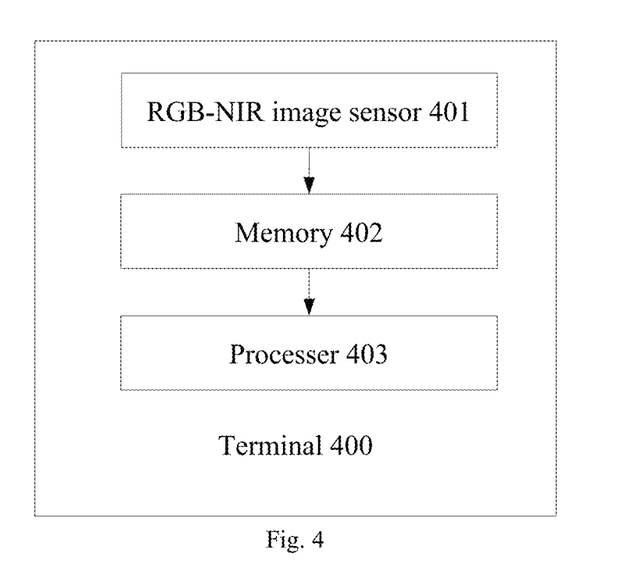
FIG. 4 is a flowchart of a terminal according to a fourth embodiment of the present disclosure.

Based on the preceding method embodiments, embodiments of the present disclosure provide a terminal, FIG. 4 is a structural diagram of a terminal according to a fourth embodiment of the present application. As shown in FIG. 4, the terminal includes an RGB-NIR image sensor 401, a memory 402, and a processor 403:

The RGB-NIR image sensor 401 is configured to obtain an RGB-NIR image sensor by replacing a G component in a Bayer RGGB mode with an NIR component.

The RGB-NIR image sensor 401 is configured to obtain an RGB-NIR RAW image.

The memory 402 is configured to store the RGB-NI R RAW image.

The processor 403 is configured to use the RGB-NIR image sensor to obtain an RGB-NIR RAW image, and to obtain an RGB image and a near-infrared (NIR) image by demosaicing the RGB-NIR RAW image based on a vector median method.

It should be noted that the description of the terminal embodiments is similar to the description of the preceding method embodiments, with similar beneficial effects as the method embodiment, thus not repeated herein. For technical details that are not described in the terminal embodiments, please refer the description of the method embodiments of the present disclosure, so it's not repeated here.

In embodiments of the present disclosure, it should be noted that, if the above image processing method is implemented in the form of software function modules and is sold or used as an independent product, the image processing method may also be stored in a computer readable storage medium. Based on this understanding, the technical solution of the embodiments of the present disclosure may be embodied in the form of a software product. The computer software product is stored in a storage medium, and includes several instructions for making a computer device (which may be a personal computer, a server, or a network device) to execute all or part of the methods described in embodiments of the present disclosure. The foregoing storage medium includes various mediums that can store program code, such as a mobile storage device, a read only memory (ROM), a magnetic disk, or an optical disc, and so on. In this way, embodiments of the present disclosure are not limited to any specific combination of the hardware and software. Correspondingly, embodiments of the present disclosure provide a computer storage medium, the computer storage medium stores computer executable instructions, and the computer executable instructions are used to perform the image processing method in embodiments of the present disclosure.

It should be understood that "an embodiment" or "one embodiment" mentioned throughout the specification means that a particular feature, structure or characteristic associated with the embodiments are included in at least one embodiment of the present application. Thus, "an embodiment" or "one embodiment" appeared in various places throughout the specification is not necessarily referring to the same embodiment. In addition, the particular feature, structure or characteristic can be combined in one or more embodiments by any suitable manner. In embodiments of the present disclosure, it should be understood that the size of the sequence numbers of the foregoing processes does not mean the order of execution. The order of execution of each process should be determined by its function and internal logic, and should not be construed as any limitation on the implementation process of embodiments of the present disclosure. The above described embodiments of the present disclosure are only for the sake of description and do not represent the pros and cons of the embodiments.

It should be noted that in the present disclosure, the terms 'comprising', 'including' or any other variant which is intended to encompass a non-exclusive inclusion, so as to include a series of elements of process, method, material or apparatus, and not only include those elements, but also include other elements that are not explicitly listed, or the elements that are inherent to these process, method, material or apparatus. In the absence of more restrictions, the elements defined by the statement 'comprising a . . . ' do not exclude the presence of the other same elements in the process, method, material or apparatus that includes the elements.

In several embodiments provided in this application, it should be understood that the disclosed apparatuses and methods may be implemented in other manners. The apparatus embodiments described above are merely exemplary. For example, the division of the units is merely a division of logical function, and it can be other division manners in actual implementation. For example, multiple units or components may be combined, or can be integrated into another system, or some features can be ignored or not executed. Additionally, the various components that are illustrated or discussed of the coupling, directly coupling, or communication link between each other can be through some interfaces, devices or units of indirect coupling or communication link, which may be electrical, mechanical or other forms.

The units as the direction of separate components may or may not be physically separated, the components as display units may or may not be physical units. It can be located in one place, also be distributed to multiple network elements. According to actual needs, some or all of the units may be selected to achieve the objective of the program in the embodiments.

In addition, the functional units in embodiments of the present disclosure may all be integrated in one processing unit, or each unit may be used as a single unit, or two or more units may be integrated in one unit. The above units that are integrated can be implemented in the form of hardware or hardware plus software functional unit.

It should be understood for persons of ordinary skill in the art that all or a part of the steps of the method embodiments can be implemented by the hardware related to the program instructions. When the program is executed, the steps of the method embodiments are performed. The foregoing storage medium includes various mediums that can store program codes, such as a mobile storage device, a read only memory (ROM), a magnetic disk, or an optical disc, and so on.

Alternatively, if the above units that are integrated are implemented in the form of a software functional mode and are sold or used as an independent product, they may also be stored in a computer readable storage medium. Based on this understanding, the technical solutions of the embodiments of the present disclosure essentially, or the part that is contributing to the prior art, may be embodied in the form of a software product. The computer software product is stored in a storage medium, and includes several instructions for making a computer device (which may be a personal computer, a server, or a network device) to execute all or part of the methods described in embodiments of the present disclosure. The foregoing storage medium includes various mediums that can store program codes, such as a mobile storage device, a read only memory (ROM), a magnetic disk, or an optical disc, and so on.

The foregoing descriptions are merely specific embodiments of the present disclosure, but the protection scope of the present application is not limited thereto. In the technical scope of the present application disclosure, the variation or replacement that can be easily thought by anyone who is familiar with this field of technology should be covered in the protection scope of the present application. Therefore, the protection scope of the present application should be subject to the protection scope of the claims.

INDUSTRIAL PRACTICABILITY

In embodiments of the present disclosure, various industrial applications can obtain an RGB-NIR image sensor replacing a G component in a Bayer RGGB mode with an NIR component; use the RGB-NIR image sensor to obtain an RGB-NIR RAW image; and obtain an RGB image and a near-infrared (NIR) image by demosaicing the RGB-NIR RAW image based on a vector median method. Thus, without an infrared image sensor, both the visible and infrared images can be obtained, saving the hardware space and enhancing user experience.

What is claimed is:
1. An image processing method, comprising:
providing an RGB-NIR image sensor with an RGB-NIR filter pattern obtained by replacing a G component in a Bayer RGGB mode with an NIR component;
using the RGB-NIR image sensor to obtain an RGB-NIR raw image; and
based on a vector median method, obtaining an RGB image and a near-infrared (NIR) image by demosaicing the RGB-NIR raw image, including:
using spectral color information for a first pixel set to form an N-dimensional vector of a first pixel, wherein the first pixel is each pixel in the RGB-NIR RAW image, the first pixel set contains pixels around the first pixel, and the N is a total number of spectral color components of the RGB-NIR RAW image;
according to an element of each dimension vector in the N-dimensional vector, determining a corresponding vector median;
forming an N-dimensional median vector $x=\{x_1, \ldots x_n\}$ by N medians corresponding to the N-dimensional vector of the first pixel, wherein $x_i$ stands for a median of i-th vector in the N-dimensional vector, $1 \leq i \leq N$; and
according to

$$r = \sqrt{x_n^2 + \ldots + x_1^2},$$

-continued $$\varphi_1 = \text{arc cot} \frac{x_1}{\sqrt{x_2^2 + \ldots + x_n^2}},$$

...

$$\varphi_{n-2} = \text{arc cot} \frac{x_{n-2}}{\sqrt{x_{n-1}^2 + x_n^2}},$$

$$\varphi_{n-1} = 2\text{arc cot} \frac{\sqrt{x_{n-1}^2 + x_n^2} + x_{n-1}}{x_n},$$

translating $x=\{x_1, \ldots x_n\}$ into $y=\{r, \phi_1, \ldots \phi_{n-1}\}$;
using 2-dimensional median filtering to process an (N−1)-dimensional vector $\{\phi_1, \ldots \phi_{n-1}\}$;
according to $$\bar{x}_1 = r\cos(\phi_1),$$

$$\bar{x}_2 = r\sin(\phi_1)\cos(\phi_2),$$

...

$$\bar{x}_{n-1} = r\sin(\phi_1) \ldots \sin(\phi_{n-2})\cos(\phi_{n-1}),$$

$\bar{x}_{n-1} = r\sin(\phi_1) \ldots \sin(\phi_{n-2})\sin(\phi_{n-1})$, calculating a filtered value in an N-dimensional Euclid space to obtain $\bar{x}=\{\bar{x}_1, \ldots, \bar{x}_n\}$ as a final pixel vector.

2. The method according to claim 1, wherein determining the pixels around the first pixel further comprises:
based on a horizontal and diagonal searching format, or a vertical and horizontal searching format, determining the pixels around the first pixel.

3. The method according to claim 1, wherein using the spectral color information for the first pixel set to form the N-dimensional vector of the first pixel further comprises:
based on a horizontal and diagonal searching format, or a vertical and horizontal searching format, determining the first pixel set;
obtaining the spectral color information for the first pixel set; and
using the spectral color information for the first pixel set to form a vector of each spectral color component of the first pixel.

4. The method according to claim 1, wherein, according to an element of each dimension vector in the N-dimensional vector, determining the corresponding vector median further comprises:
for the element of each dimension vector $x_i$, calculating a one-dimensional distance $$S_i^1 = \sum_{j=1}^{N} \|x_i - x_j\|_1, \quad i = 1, \ldots N$$

and a two-dimensional distance $$S_i^2 = \sum_{j=1}^{N} \|x_i - x_j\|_2, \quad i = 1, \ldots N$$

between the element and a neighbouring element, and counting a sum $S_i$ of the one-dimensional distance and the two-dimensional distance as $S_i = S^1_i + S^2_i$; and
determining the element $x_i$ corresponding to a minimum value in the $S_i$ as the corresponding vector median.

5. A non-transitory computer-readable storage medium, storing computer-executable instructions for execution by a processor configured to:
use an RGB-NIR image sensor to obtain an RGB-NIR raw image, wherein the RGB-NIR image sensor is provided with an RGB-NIR filter pattern obtained by replacing a G component in a Bayer RGGB mode with an NIR component; and
obtain an RGB image and a near-infrared (NIR) image by demosaicing the RGB-NIR raw image based on a vector median method, wherein the processor is further configured to:
use spectral color information for a first pixel set to form an N-dimensional vector of a first pixel, wherein the first pixel is each pixel in the RGB-NIR RAW image, the first pixel set contains pixels around the first pixel, and the N is a total number of spectral color components of the RGB-NIR RAW image;
according to an element of each dimension vector in the N-dimensional vector, determine a corresponding vector median;
form an N-dimensional median vector $x=\{x_1, \ldots x_n\}$ by N medians corresponding to the N-dimensional vector of the first pixel, wherein $x_i$ stands for a median of i-th vector in the N-dimensional vector, $1 \leq i \leq N$;
according to $$r = \sqrt{x_n^2 + \ldots + x_1^2},$$

$$\varphi_1 = \text{arc cot} \frac{x_1}{\sqrt{x_2^2 + \ldots + x_n^2}},$$

...

$$\varphi_{n-2} = \text{arc cot} \frac{x_{n-2}}{\sqrt{x_{n-1}^2 + x_n^2}},$$

$$\varphi_{n-1} = 2\text{arc cot} \frac{\sqrt{x_{n-1}^2 + x_n^2} + x_{n-1}}{x_n},$$

translate $x=\{x_1, \ldots x_n\}$ into $y=\{r, \phi_1, \ldots \phi_{n-1}\}$;
use 2-dimensional median filtering to process an (N−1)-dimensional vector $\{\phi_1, \ldots \phi_{n-1}\}$; and
according to $$\bar{x}_1 = r\cos(\phi_1),$$

$$\bar{x}_2 = r\sin(\phi_1)\cos(\phi_2),$$

...

$$\bar{x}_{n-1} = r\sin(\phi_1) \ldots \sin(\phi_{n-2})\cos(\phi_{n-1}),$$

$$\bar{x}_{n-1} = r\sin(\phi_1) \ldots \sin(\phi_{n-2})\sin(\phi_{n-1}),$$

calculate a filtered value in an N-dimensional Euclid space to obtain $\bar{x}=\{\bar{x}_1, \ldots \bar{x}_n\}$ as a final pixel vector.

6. The storage medium according to claim 5, wherein the processor is configured to determine the pixels around the first pixel by:
  based on a horizontal and diagonal searching format, or a vertical and horizontal searching format, determining the pixels around the first pixel.

7. The storage medium according to claim 5, wherein the processor is further configured to:
  determine the first pixel set based on a horizontal and diagonal searching format or a vertical and horizontal searching format;
  obtain the spectral color information for the first pixel set; and
  use the spectral color information for the first pixel set to form a vector of each spectral color component of the first pixel.

8. The storage medium according to claim 5, wherein the processor is further configured to:
  calculate a one-dimensional distance $$S_i^1 = \sum_{j=1}^{N} \|x_i - x_j\|_1, \quad i = 1, \ldots N$$

and a two-dimensional distance $$S_i^2 = \sum_{j=1}^{N} \|x_i - x_j\|_2, \quad i = 1, \ldots N$$

between the element of each dimension vector $x_i$ and a neighbouring element, and count a sum $S_i$ of the one-dimensional distance and the two-dimensional distance as $S_i = S^1_i + S^2_i$; and
  determine the element $x_i$ corresponding to a minimum value in the $S_i$ as the corresponding vector median.

9. A terminal, comprising:
  an RGB-NIR image sensor, a memory and a processor, wherein:
  the RGB-NIR image sensor is provided with an RGB-NIR filter pattern obtained by replacing a G component in a Bayer RGGB mode with an NIR component and is configured to obtain an RGB-NIR raw image;
  the memory is configured to store the RGB-NIR raw image; and
  the processor is configured to obtain an RGB image and a near-infrared (NIR) image by demosaicing the RGB-NIR raw image based on a vector median method, wherein the processor is further configured to:
    use spectral color information for a first pixel set to form an N-dimensional vector of a first pixel, wherein the first pixel is each pixel in the RGB-NIR RAW image, the first pixel set contains pixels around the first pixel, and the N is a total number of spectral color components of the RGB-NIR RAW image;
    according to an element of each dimension vector in the N-dimensional vector, determine a corresponding vector median;
    form an N-dimensional median vector $x=\{x_1, \ldots x_n\}$ by N medians corresponding to the N-dimensional vector of the first pixel, wherein $x_i$ stands for a median of i-th vector in the N-dimensional vector, $1 \le i \le N$;
  according to $$r = \sqrt{x_n^2 + \ldots + x_1^2},$$

$$\varphi_1 = \text{arc cot} \frac{x_1}{\sqrt{x_2^2 + \ldots + x_n^2}},$$

$$\ldots$$

$$\varphi_{n-2} = \text{arc cot} \frac{x_{n-2}}{\sqrt{x_{n-1}^2 + x_n^2}},$$

$$\varphi_{n-1} = 2\text{arc cot} \frac{\sqrt{x_{n-1}^2 + x_n^2} + x_{n-1}}{x_n},$$

translate $x=\{x_1, \ldots x_n\}$ into $y=\{r, \phi_1, \ldots \phi_{n-1}\}$;
use 2-dimensional median filtering to process an (N−1)-dimensional vector $\{\phi_1, \ldots \phi_{n-1}\}$;
according to $$\bar{x}_1 = r\cos(\phi_1),$$

$$\bar{x}_2 = r\sin(\phi_1)\cos(\phi_2),$$

$$\ldots$$

$$\bar{x}_{n-1} = r\sin(\phi_1) \ldots \sin(\phi_{n-2})\cos(\phi_{n-1}),$$

$\bar{x}_{n-1} = r\sin(\phi_1) \ldots \sin(\phi_{n-2})\sin(\phi_{n-1})$, calculate a filtered value in an N-dimensional Euclid space to obtain $\bar{x}=\{\bar{x}_1, \ldots \bar{x}_n\}$ as a final pixel vector.

10. The terminal according to claim 9, wherein the processor is further configured to:
  based on a horizontal and diagonal searching format, or a vertical and horizontal searching format, determine the first pixel set;
  obtain the spectral color information for the first pixel set; and
  use the spectral color information for the first pixel set to form a vector of each spectral color component of the first pixel.

11. The terminal according to claim 9, wherein the processor is further configured to:
  for the element of each dimension vector $x_i$, calculate a one-dimensional distance $$S_i^1 = \sum_{j=1}^{N} \|x_i - x_j\|_1, \quad i = 1, \ldots N$$

and a two-dimensional distance $$S_i^2 = \sum_{j=1}^{N} \|x_i - x_j\|_2, \quad i = 1, \ldots N$$

between the element and a neighbouring element, and count a sum $S_i$ of the one-dimensional distance and the two-dimensional distance as $S_i = S^1_i + S^2_i$; and
  determine the element $x_i$ corresponding to a minimum value in the $S_i$ as the corresponding vector median.

* * * * *